Figure 1:
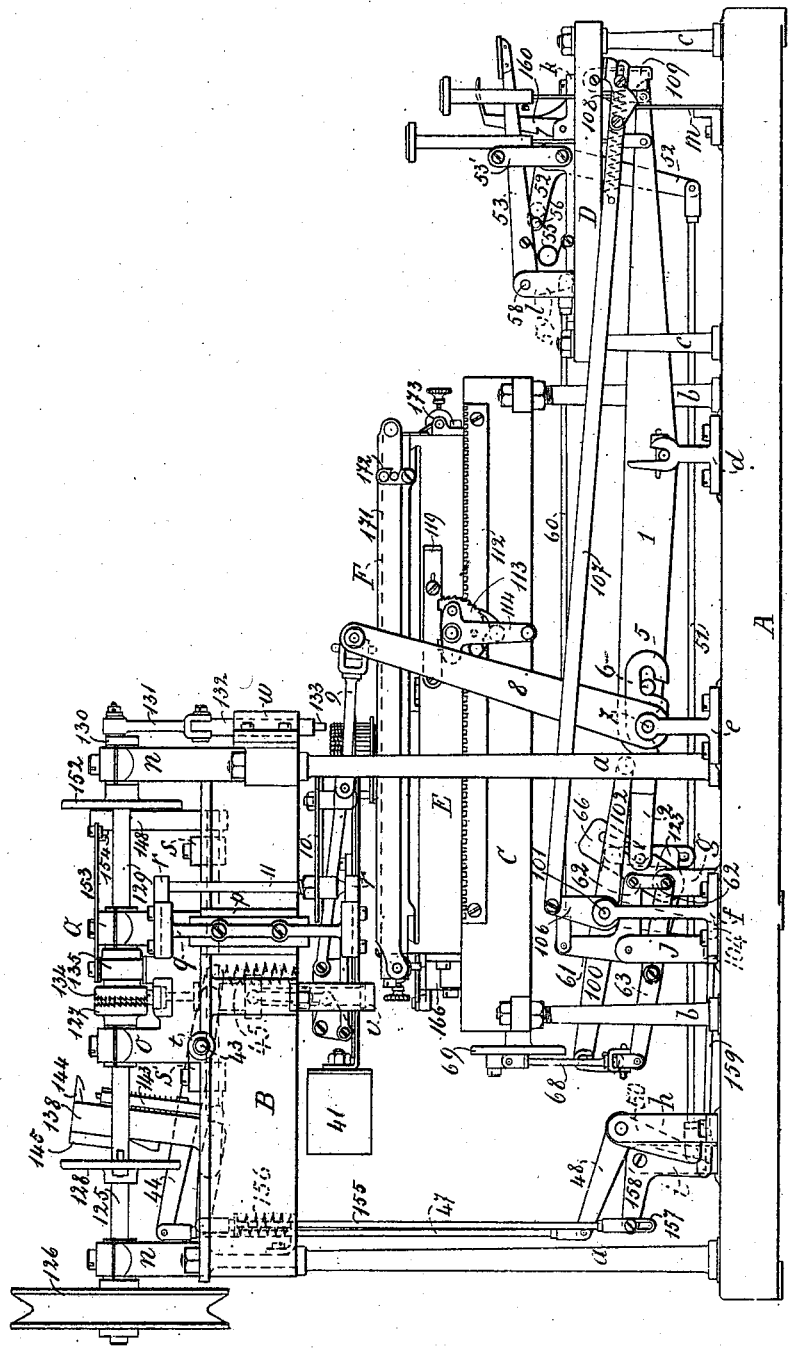

(No Model.) 12 Sheets—Sheet 1.

A. J. KLETZKER & J. G. GOESEL.
MATRIX MAKING MACHINE.

No. 485,702. Patented Nov. 8, 1892.

Witnesses

Inventors.

(No Model.) 12 Sheets—Sheet 2.

A. J. KLETZKER & J. G. GOESEL.
MATRIX MAKING MACHINE.

No. 485,702. Patented Nov. 8, 1892.

Witnesses.

Inventors.

(No Model.) 12 Sheets—Sheet 3.

A. J. KLETZKER & J. G. GOESEL.
MATRIX MAKING MACHINE.

No. 485,702. Patented Nov. 8, 1892.

Witnesses

Inventors.

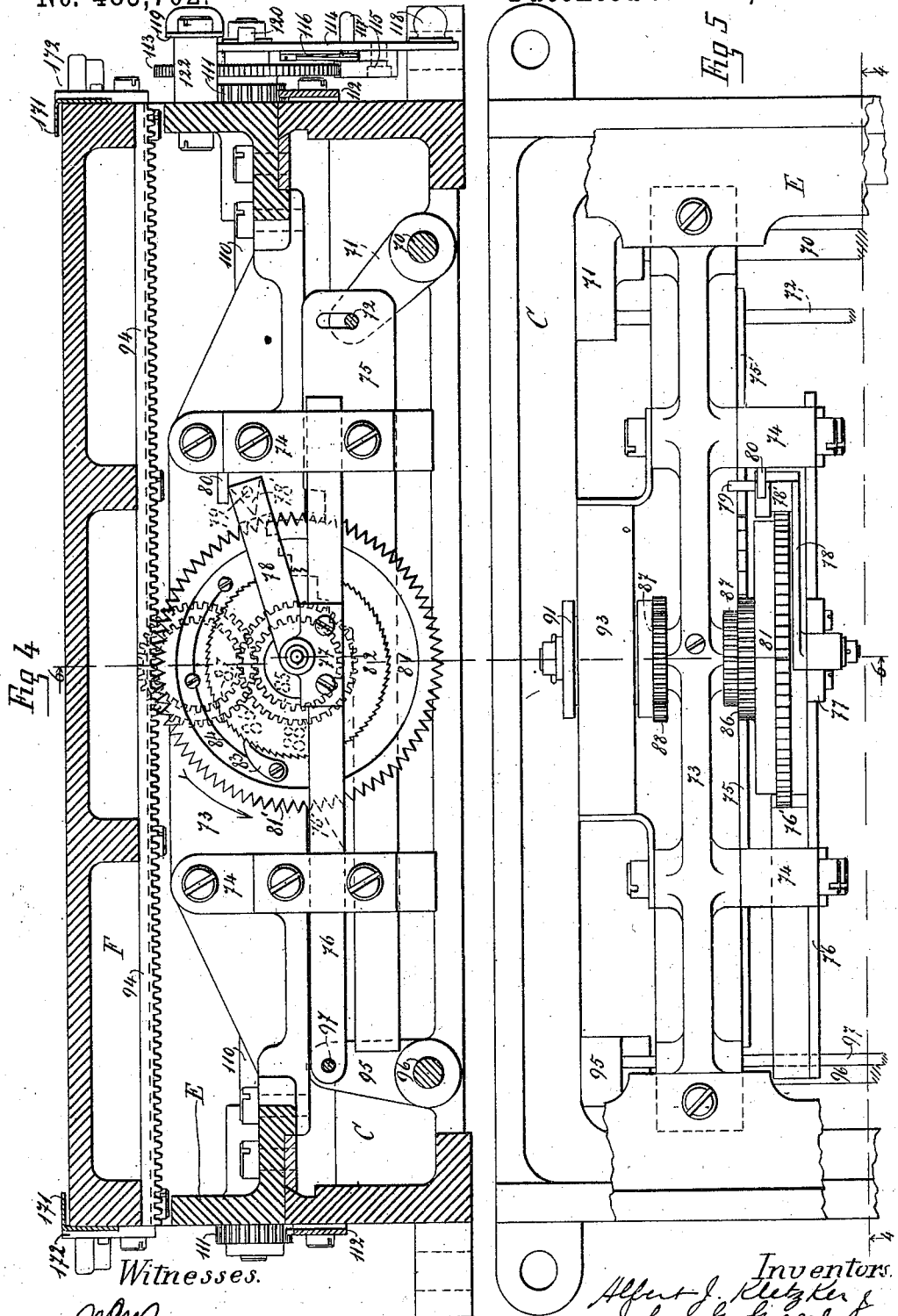

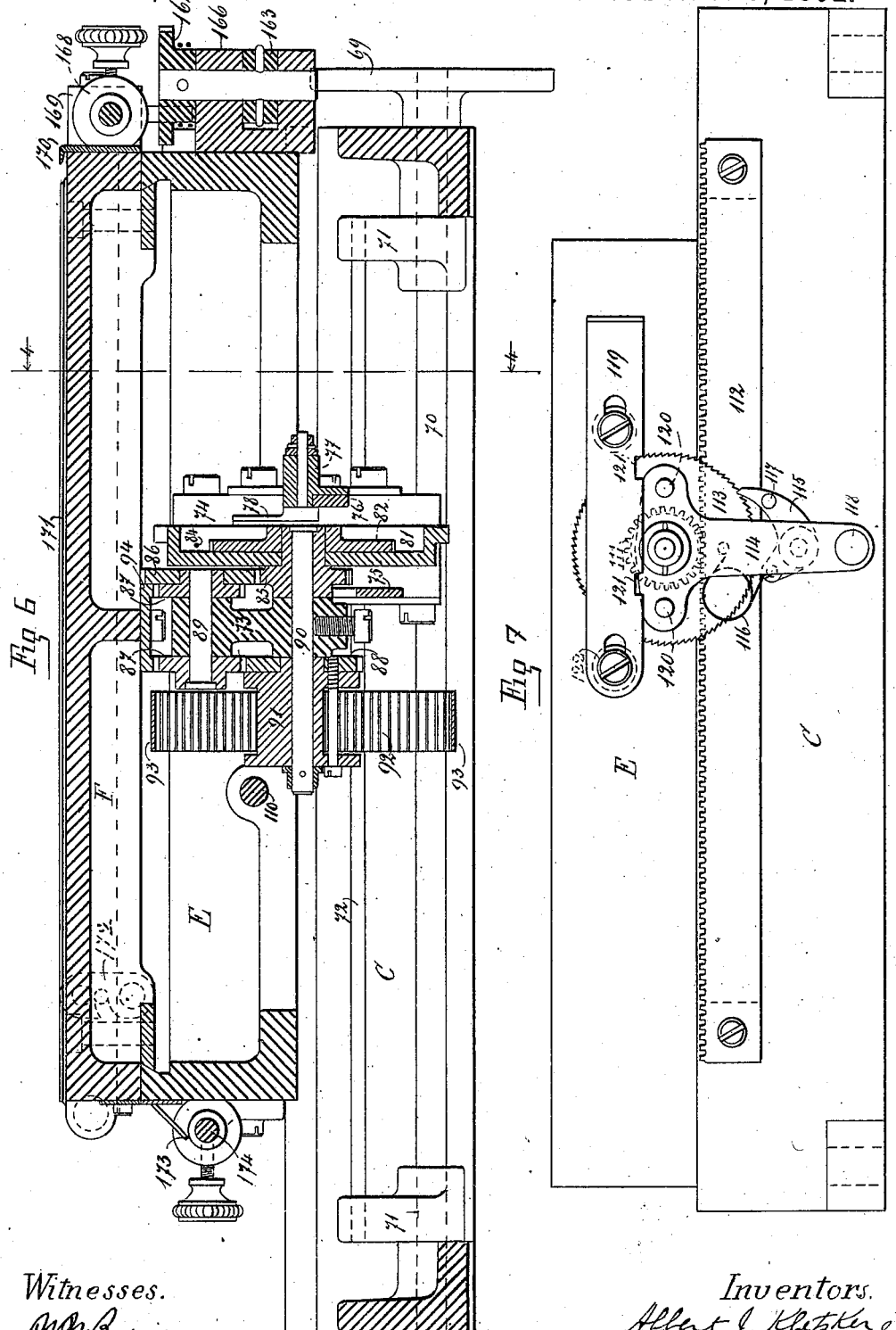

(No Model.) 12 Sheets—Sheet 6.
A. J. KLETZKER & J. G. GOESEL.
MATRIX MAKING MACHINE.
No. 485,702. Patented Nov. 8, 1892.
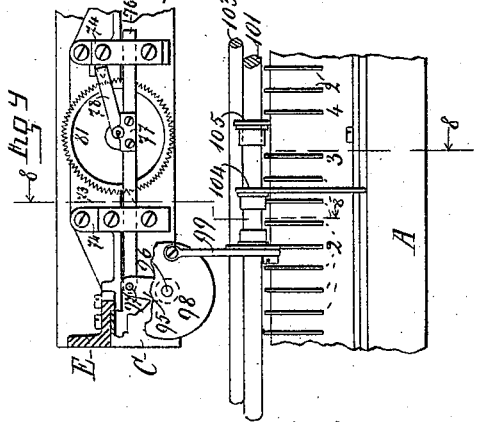
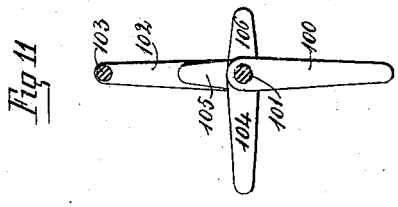
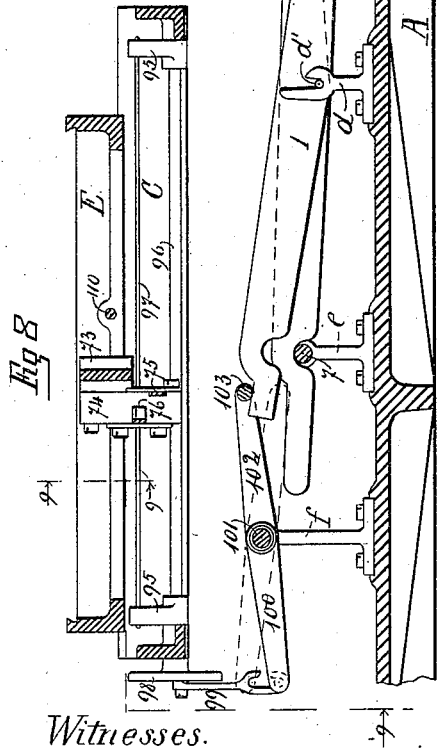
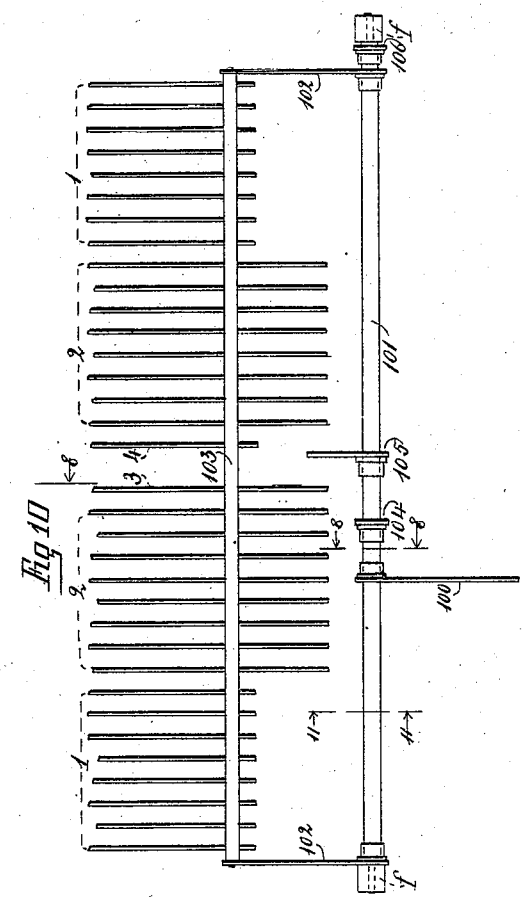
Witnesses. Inventors.

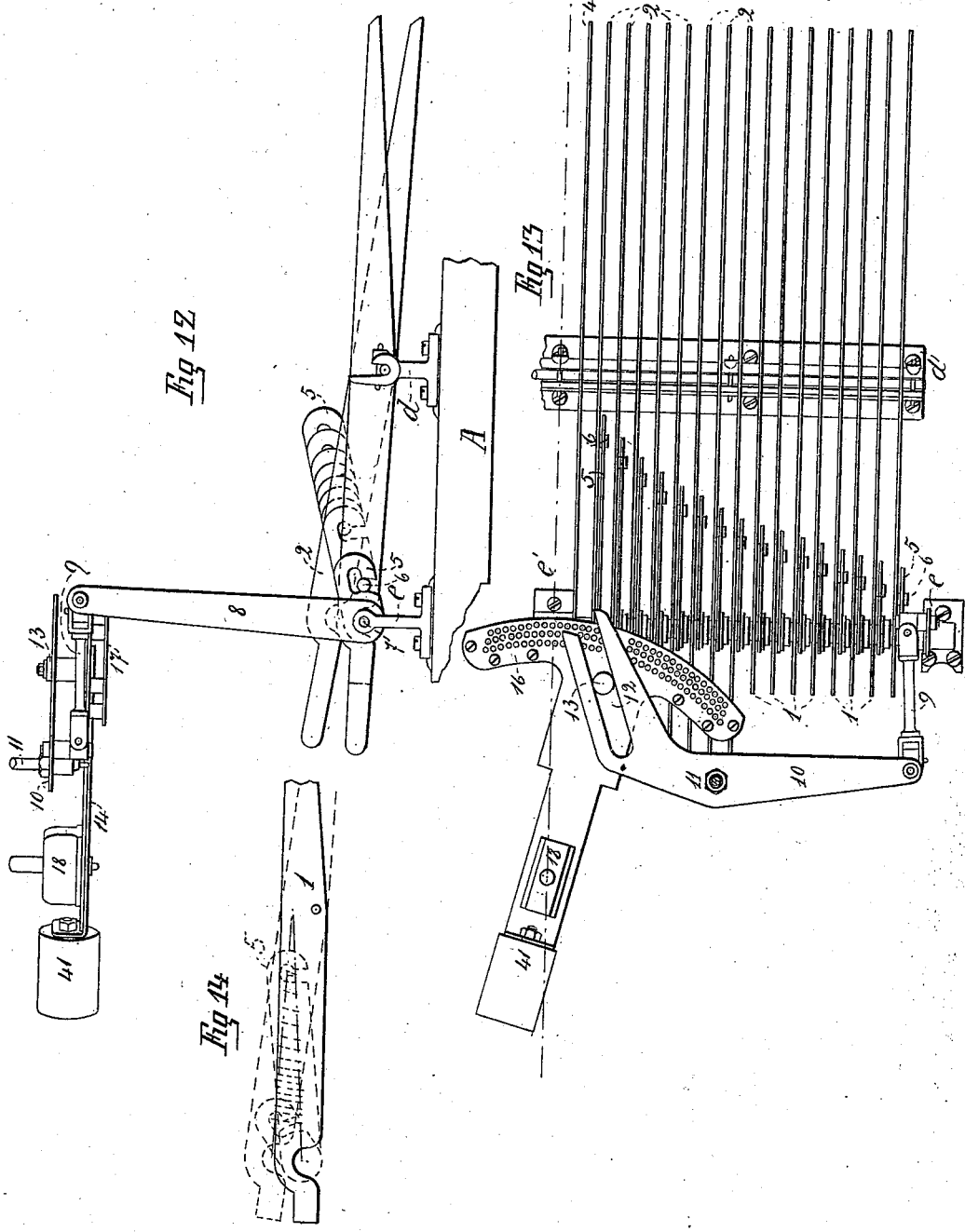

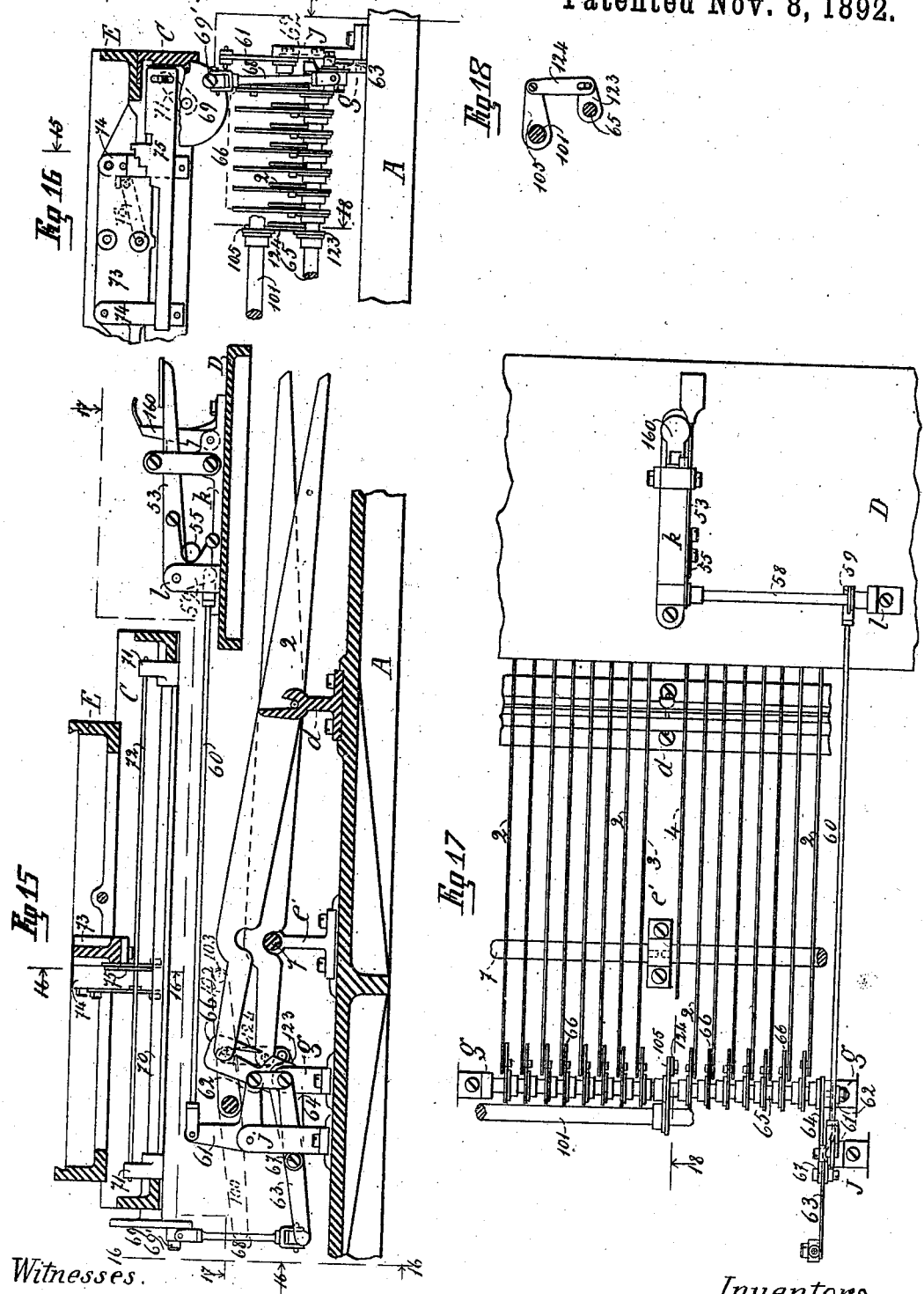

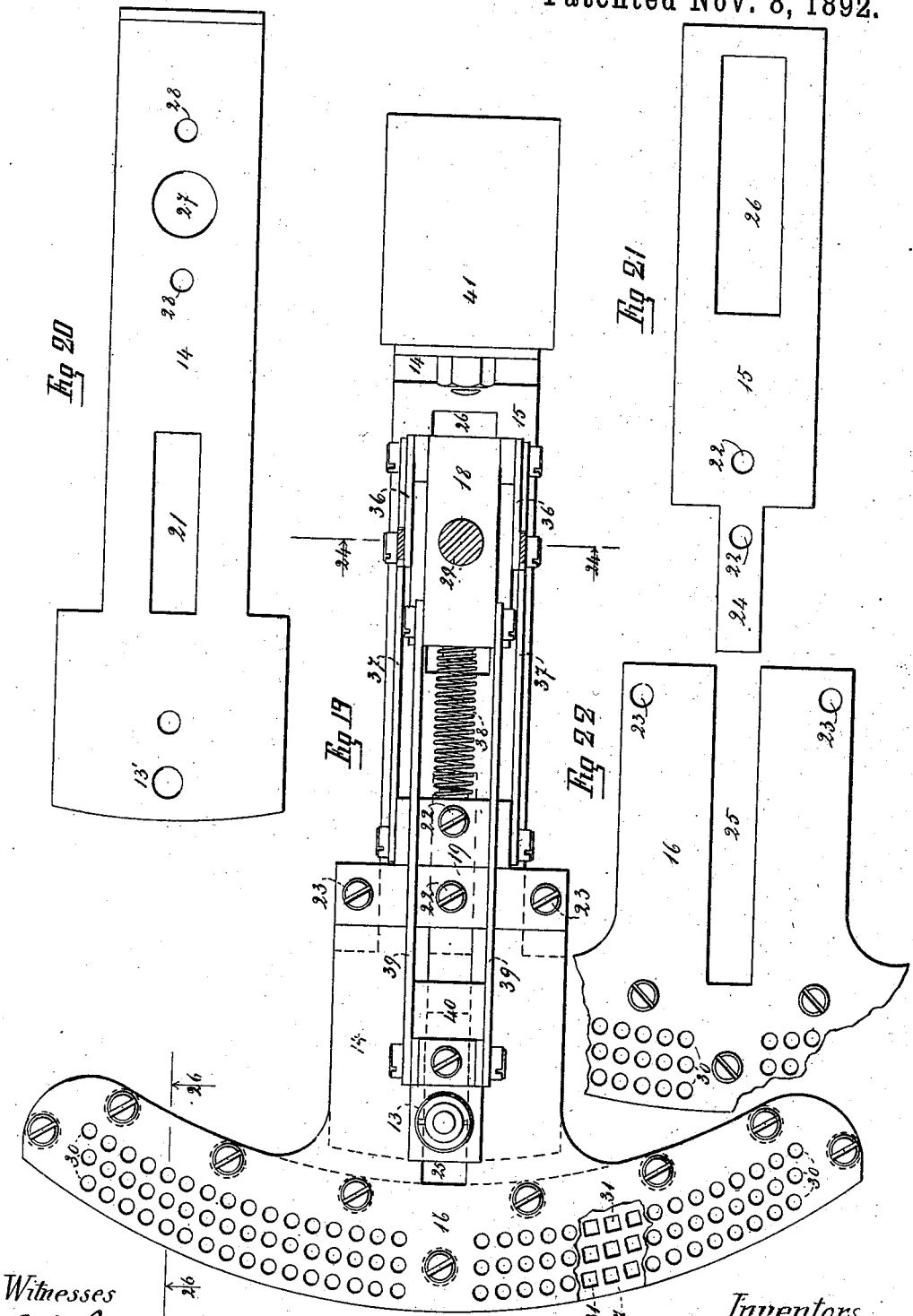

(No Model.) 12 Sheets—Sheet 10.
A. J. KLETZKER & J. G. GOESEL.
MATRIX MAKING MACHINE.
No. 485,702. Patented Nov. 8, 1892.
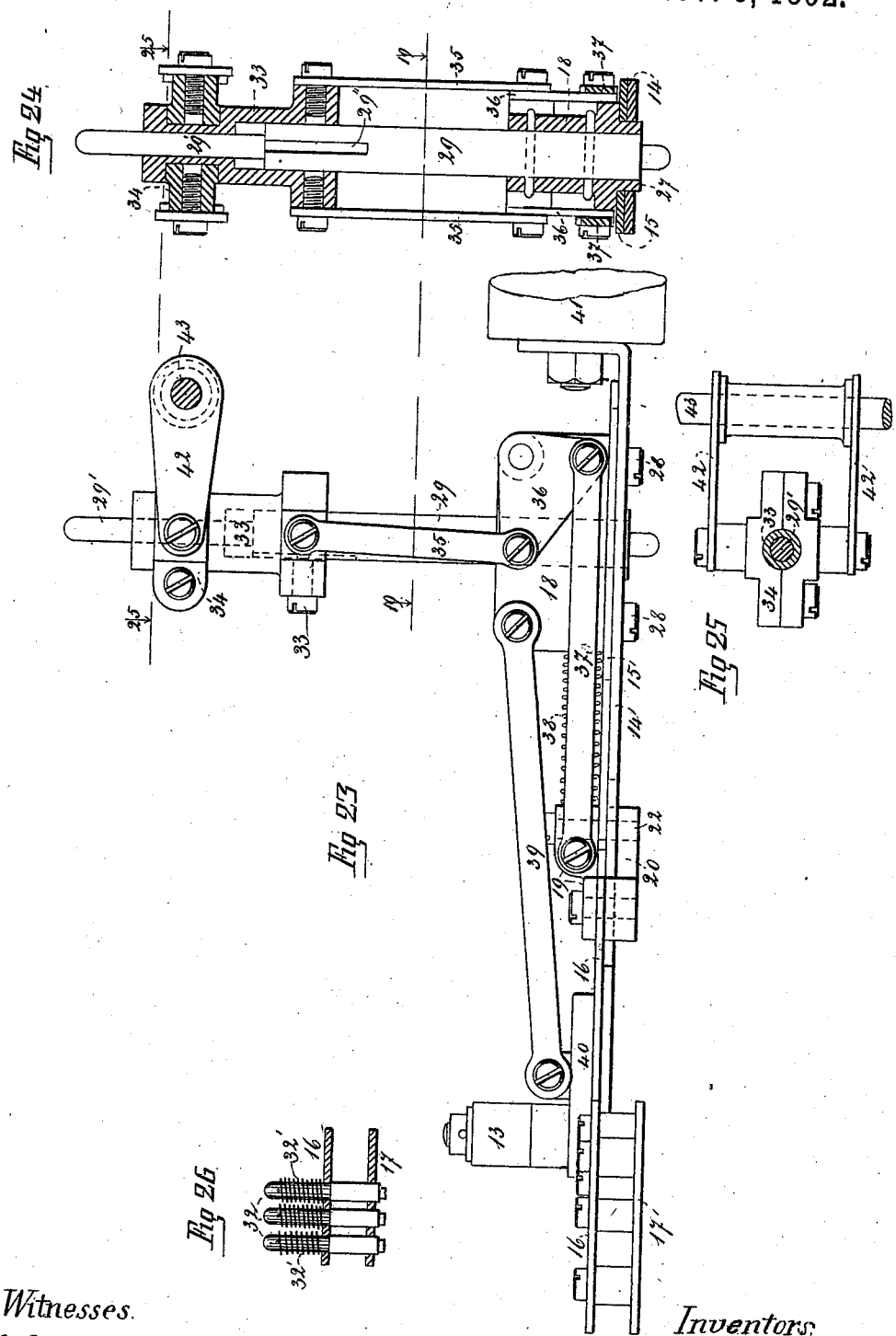
Witnesses.
Inventors.

(No Model.) 12 Sheets—Sheet 11.
A. J. KLETZKER & J. G. GOESEL.
MATRIX MAKING MACHINE.
No. 485,702. Patented Nov. 8, 1892.
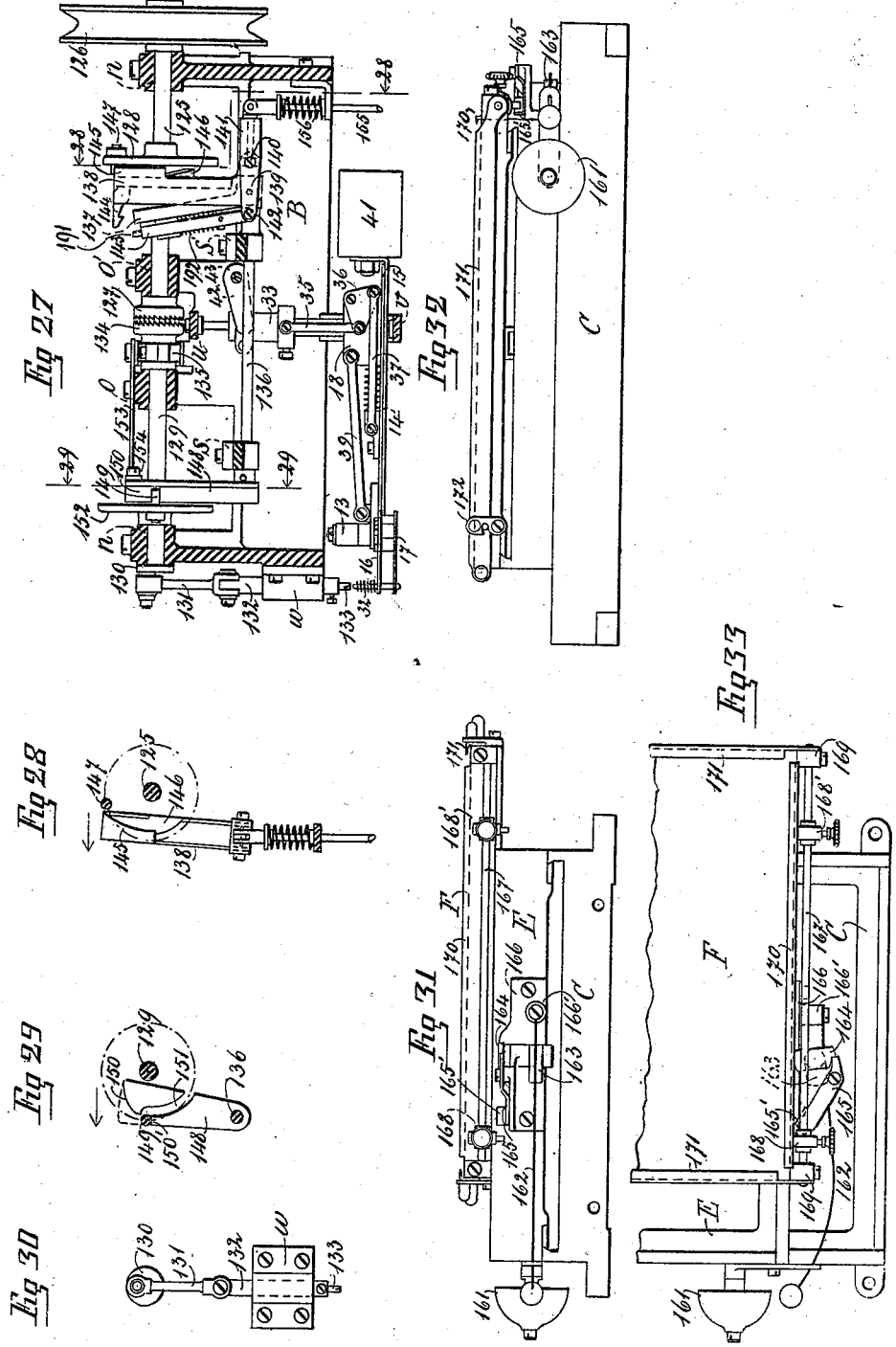
Witnesses.
Inventors.

(No Model.) 12 Sheets—Sheet 12.

A. J. KLETZKER & J. G. GOESEL.
MATRIX MAKING MACHINE.

No. 485,702. Patented Nov. 8, 1892.

Witnesses

Inventors
Albert J. Kletzker &
John G. Goesel by
Paul Bakewell
their attorney

THE NORRIS PETERS CO., WASHINGTON, D. C.

UNITED STATES PATENT OFFICE.

ALBERT J. KLETZKER AND JOHN G. GOESEL, OF ST. LOUIS, MISSOURI.

MATRIX-MAKING MACHINE.

SPECIFICATION forming part of Letters Patent No. 485,702, dated November 8, 1892.

Application filed January 8, 1892. Serial No. 417,349. (No model.)

*To all whom it may concern:*

Be it known that we, ALBERT J. KLETZKER, a citizen of the United States, and JOHN G. GOESEL, a citizen of France, both residing in the city of St. Louis and State of Missouri, have invented certain new and useful Improvements in Matrix-Making Machines, of which the following is a full, clear, and exact description.

Our invention relates to machines for producing matrices from which to make stereotype or electrotype plates for printing, and to machines for producing matrices for the purpose specified, intended to replace the forms of individually-set type, as in ordinary practice, in book and newspaper work.

The object of our invention is to construct a matrix-making machine simple and convenient in operation and adapted to fulfill in all respects the conditions as provided for in a form of type for the production of printing-plates—*i. e.*, capable of variable spacing for, first, the different space occupied in the line by different letters or characters, and, second, the interword spacing for the justification of the line; capable of a blow of uniform pressure being given to the dies, so as to produce a matrix-plate from which a printing-plate can be taken having a plane printing-surface, adapted to make perfect alignment; capable of conveniently changing the different fonts of characters, as from lower-case to capitals, &c.; capable of making matrix-plates of variable-column widths, adapting the matrix-plates to be retraced for the correction of mistakes, and capable of variable spacing between lines, corresponding to solid set or single or double leaded matter.

Our invention consists in the novel mechanism hereinafter described for giving variable degrees of movement to the matrix-board carriage corresponding to the line-space required for different letters or characters; the mechanism by means of which in the operation of the same key the degree of movement of the matrix-board carriage required for the line-space of ordinary letters will be changed so as to be proportioned to the line-space required for the corresponding capital letters; in the mechanism for making variable spacing between words; in the mechanism for indicating how much line-space there is left unoccupied on the matrix-board; in the means for producing the impression on the matrix-board by a force independent of that applied to actuate the key operating the desired die; in the arrangement by which is brought into action the mechanism for producing the impression; in a new form of die-holder and mechanism for operating the same, whereby perfect alignment is obtained; in mechanism for bringing into position the different fonts to be acted on by the impression-giving device; in a specially-formed die-shank to accommodate the same, insuring the alignment of the individual dies; in an arrangement whereby the die-holder proper is made removable, so as to be replaced by other similar and interchangeable ones containing different kinds or fonts of dies; in the mechanism by means of which by depressing the keys the different dies are successively brought into the proper position to be acted upon by the impression-giving device; in the arrangement of the framework for the reception of the movable parts; in the arrangement of the sliding matrix-board carriage and the escapement mechanism connected therewith; in the mechanism for operating the signaling-bell, and in its arrangement in relation to the sliding carriage.

Figure 2:
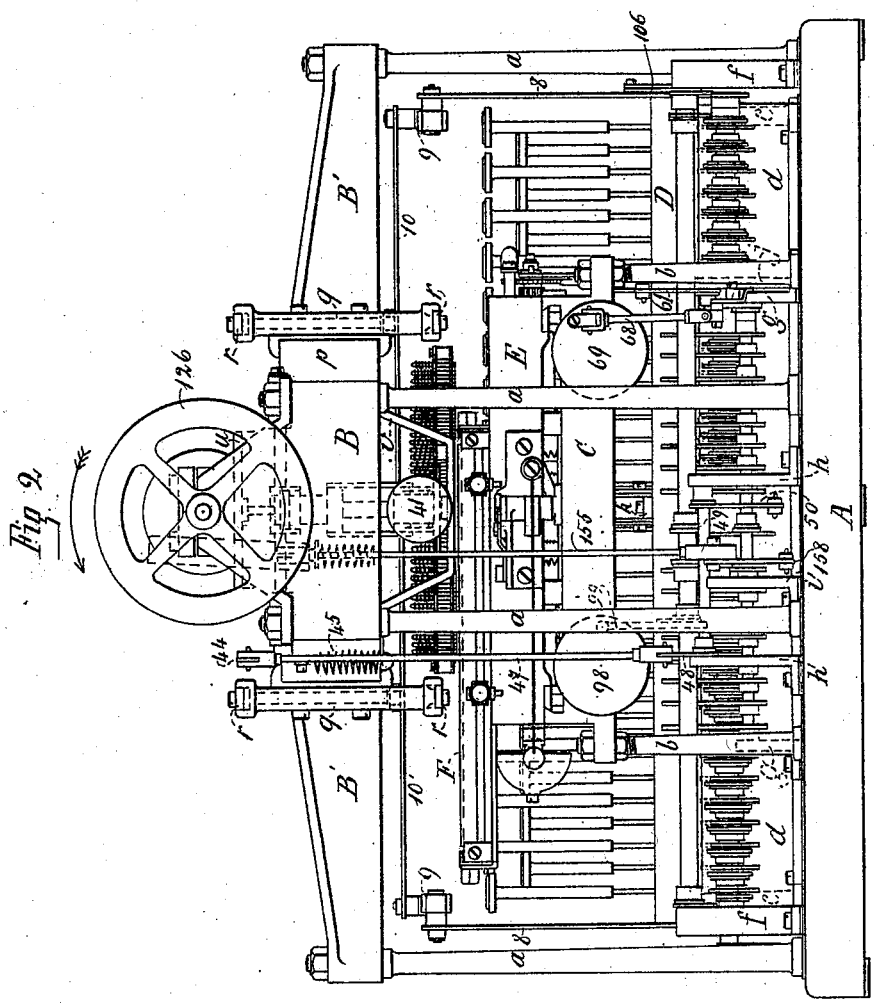
Figure 3:
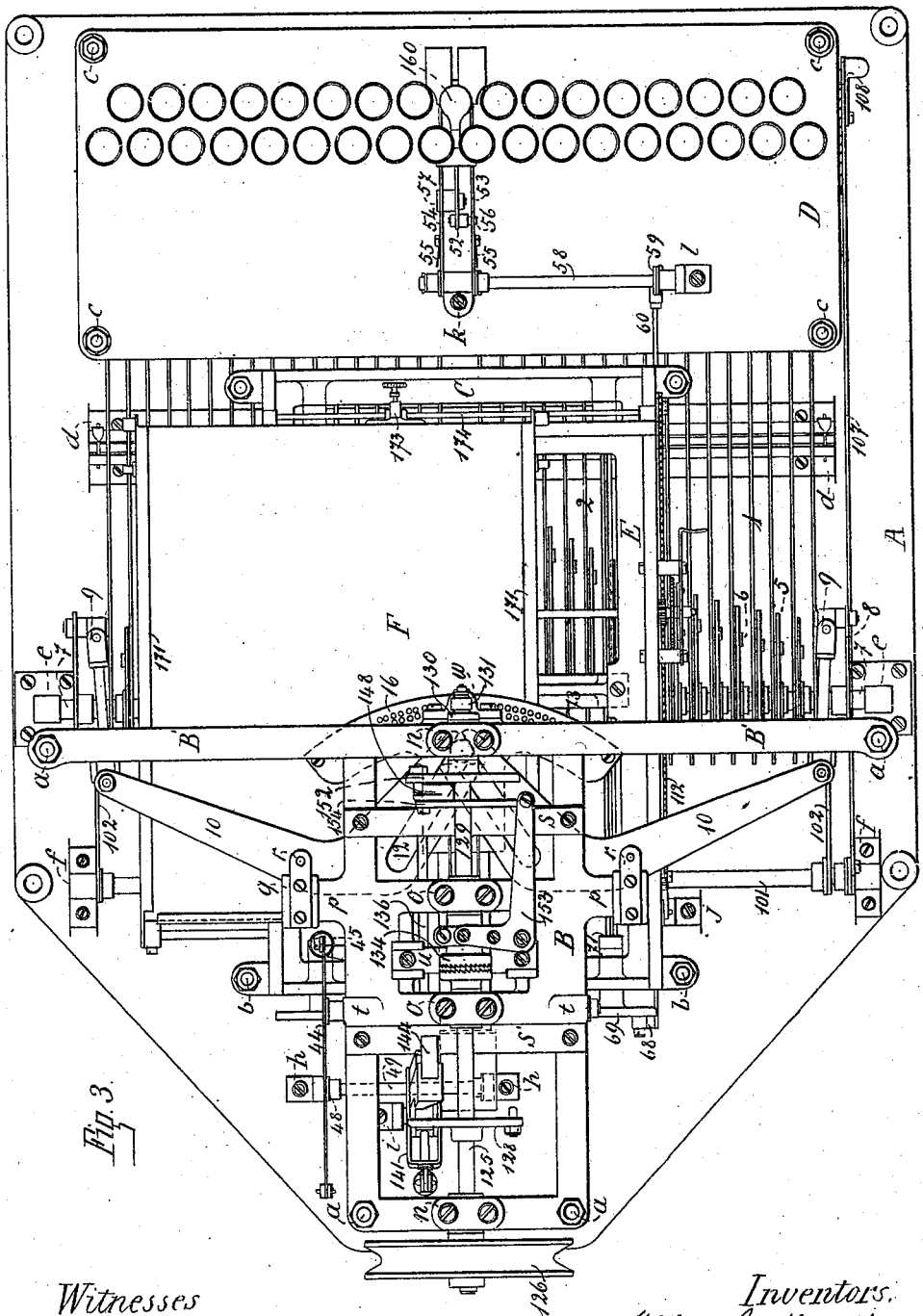
Figure 36:
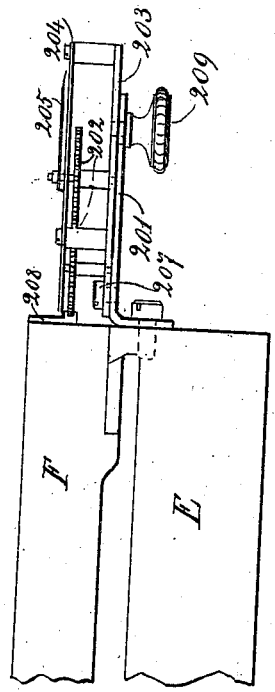
Figure 37:
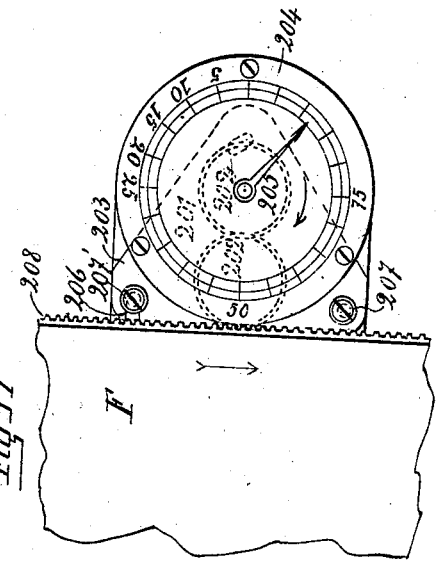
Figure 34:
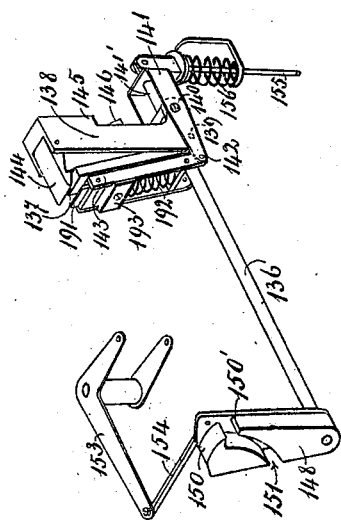
Figure 35:
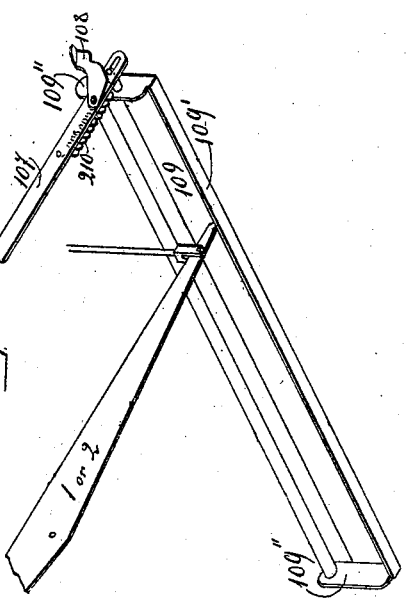

In the accompanying drawings, in which like symbols of reference denote like parts in the several figures, Figures 1, 2, and 3 are general views of the machine as a whole, being, respectively, a side elevation, a back end elevation, and a plan view. Figs. 4, 5, and 6 represent the escapement mechanism for operating the sliding matrix-board carriage in its lateral or line-spacing movement, being, respectively, a cross-section taken on line 4 4 in Figs. 5 and 6, a plan view with the matrix carriage or platen removed, and a longitudinal section taken on line 6 6 in Figs. 4 and 5. Fig. 7 is a side elevation of the mechanism for operating the matrix-carriage in its backward and forward or interline-spacing movement. Figs. 8, 9, 10, and 11 are illustrative of the mechanism for operating the escapement governing the lateral movement of the matrix-carriage, Fig. 8 being a section taken on line 8 8 in Figs. 9 and 10. Fig. 9, an elevation, partly in section, taken as on line 9 9 in Fig. 8; Fig. 10, a plan view of the key levers and rocking shaft operating the escapement mechanism, and Fig. 11 a section taken on line 11 in Fig. 10, showing the relative position of the lever-arms. Figs. 12, 13, and 14 are detail views of the mechanism by means of which the proper die is brought into position to be operated on by the stamping-punch, Fig. 12 being a side elevation, Fig. 13 a plan view, and Fig. 14 a diagrammatical view demonstrating the method employed and the arrangement of pins in the key-levers and the slots in the differential levers. Figs. 15, 16, 17, and 18 illustrate the mechanism producing the variations in line-spacing necessary for different letters or characters and between lower-case and capitals, Fig. 15 being a vertical longitudinal section taken on line 15 15 in Fig. 16, Fig. 16 a vertical cross-section taken on line 16 16 in Fig. 15, with parts broken away, Fig. 17 a plan view or horizontal section taken on line 17 17 in Fig. 15, and Fig. 18 a detail view or vertical section taken on line 18 18 in Figs. 16 and 17, showing the resetting-levers and links. Figs. 19, 20, 21, 22, 23, 24, 25, and 26 are enlarged detail views of the die-holder and mechanism for operating the same, Fig. 19 being a plan view or a horizontal section taken on line 19 19 in Figs. 23 and 24, with a portion of the upper plate, hereinafter described, broken away, displaying the holes in the lower plate; Figs. 20, 21, and 22, details of Figs. 19 and 23; Fig. 23, a side elevation of the die-holder with operating mechanism; Fig. 24, a vertical cross-section taken centrally through the pivot-spindle or as on line 24 24 in Fig. 19; Fig. 25, a horizontal section taken on line 25 25 in Fig. 23, and Fig. 26 a cross-section taken on line 26 26 in Fig. 19, but with the dies inserted in the die-holder. Figs. 27, 28, 29, and 30 are illustrative of the arrangements provided for punching or stamping the dies into the matrix-board and the connecting mechanism between the same and the key-levers, Fig. 27 being a vertical longitudinal section taken through the axis of the operating-shaft with parts in front of this axis in elevation. Figs. 28 and 29 are details shown in vertical sections taken, respectively, on lines 28 28 and 29 29 in Fig. 27; and Fig. 30 is a front elevation of the stamping-punch, crank, and connecting-rod. Figs. 31, 32, and 33 are illustrative of the signaling-bell arrangement, Fig. 31 being an elevation of the back part of the carriage-slides as shown at Fig. 2, Fig. 32 a side elevation of the same, and Fig. 33 a plan view. Fig. 34 is an isometrical perspective view of the lever arrangement for shifting the clutch-coupling between the constantly-rotating power-driven shaft and the shaft operating the stamping-punch. Fig. 35 is a perspective view of the locking device for the key-levers, to prevent a second key being depressed before the work of the first is completed and to lock all the key-levers when the machine is not in use. Figs. 36 and 37 are respectively a side elevation and a plan view of the line-space indicating device.

In the following description we have made use of both letters and figures in making reference to the different parts of the machine, endeavoring in all instances to confine the letters to the stationary framework and principal parts and the figures to the movable parts, as illustrated in the drawings. In some instances the figures have been duplicated in indicating the lines on which sections have been taken for other figures. In all such instances, however, the figures indicating the lines on which the sections have been taken are accompanied with an arrow, which indicates the direction in which the section, as shown by the figure to which it refers, should be viewed.

As illustrated in Figs. 1, 2, and 3, the machine as a whole is supported on the base-plate A. To the base-plate A are secured the standards $a$, which support the raised framework B, with the laterally-extending spanning arms or girders B', (see Figs. 2 and 3,) the standards $b$, which support the stationary carriage-frame C for the matrix-carriages, the standards $c$, which support the platform D, and the several standards and brackets for the shaft and spindle-bearings, as $d\ e\ f\ g\ h\ i$, &c. To the raised framework B are secured the supports, bearings, &c., $o\ p\ q\ s$, &c., for the various working parts relating to the stamping or punching device, and the pivot-bearings $u$, $v$, and $r$ of the spindles for the die-holder and operating fork-lever.

The stationary carriage-frame C is fastened to parts $b$, so as to be adjustable not only in height, but also in position, Fig. 1. It is provided longitudinally with slideways, to which the intermediate carriage E is fitted and on which E can be moved. Superposed and moving at right angles to E is the matrix-carriage or matrix-table F, receiving the matrix-board and moving in proper position for letters, spaces, and sundry characters by the force of a spring acting on an escapement mechanism connected to the intermediate carriage E.

The raised platform D, fastened to posts $c$, acts as a guide for the vertical key-stems and as a support for the brackets of the keys destined to operate the font-changing mechanism.

As shown in Figs. 1, 2, and 3, the machine as a whole is operated by a number of key-levers which extend from the front of the machine to a convenient distance toward the back, their forward ends resting immediately beneath the keyboard-platform D. To each key-lever is attached by a hinge-joint a vertical stem passing through holes in the platform D, being guided in them and bearing at their upper ends a knob or finger-button, each marked with the letters or characters corresponding with the die the key to which it is connected is intended to operate. The bank of key-levers on one-half of the machine, Figs.

3 and 10, is divided into two series, one of which is a duplicate of the other. All the key-levers are fulcrumed approximately midway in their length (see 1, Fig. 1) on the support $d$, extending across the width of the machine, Figs. 2 and 3. The support $d$ is transversely slotted out for the reception of the key-levers to keep them at regular distances apart. The fulcrum-rod $d'$, (see Figs. 8 and 10,) being thrust through holes in the key-levers 3 and 4, acts as a fulcrum-pin for each of them.

As indicated in the several figures, particularly in Fig. 19, the dies are distributed in several rows in the die-holder, the number of which may vary with the number of characters required. For illustration we have adopted three—for lower case one, for upper case a second one, and for figures and other signs a third one.

Referring to Figs. 4, 5, 6, 8, 9, 10, and 11, the circular rod 103 extends transversely over the back ends of all the key-levers 1, 2, 3, and 4, so that when any one of the keys is depressed the rod 103 will be lifted. The two ends of the rod 103 are provided with pins which rotate in the projecting ends of the two lever-arms 102, which are rigidly secured to the rocking shaft 101, journaled at either end in the bearings in brackets $f$. To the shaft 101 is secured the lever-arm 100, the free end of which is provided with a pin or screw fitting freely in a slot at the end of the link 99. (See Figs. 8 and 9.) The other end of the link 99 is joined to a pin fastened to the disk 98, which is rigidly secured to the oscillating shaft 96, to which are also fastened the two levers 95. This shaft 96 extends over the whole length of the carriage-frame C, with journal-bearings at both ends. In the ends of the levers 95, parallel with the shaft 96, is secured the rod 97. This rod 97 fits loosely in a hole in one end of the sliding bar 76, which slides freely in the guide-blocks 74, secured to the escapement-frame 73, the two ends of the latter being screwed to projecting ribs of the two opposite side walls of intermediate carriage E. (See Figs. 4 and 5.) One end of the thick part of the sliding bar 76 is formed into the detent 76', which engages in the teeth 81' of the wheel 81 or releases them under the oscillations of the rod 97 in all the positions which the intermediate carriage E may assume on the carriage-frame C. To the bar 76 is secured the bearing-block 77, which receives the pawl-arm 78. The free end of the pawl-arm 78 is formed into the detent 78', (see Figs. 4 and 5,) alternately engaging and disengaging the teeth 81' of the escapement-wheel 81, according to the action of the sliding bar 76. When detent 78' is engaged in the teeth, the center of bearing 77 is in the center of escapement-wheel 81, and it can therefore move concentrically with the latter. The two detents 76' and 78' are so placed one in relation to the other that when one is engaged in the teeth of escapement-wheel 81 the other is disengaged from it. The escapement-wheel 81 is idle on the hub of gear-wheel 85, while the ratchet-wheel 82 is fastened to it, so that 85 and 82 move together. Ratchet-wheel 82 and escapement-wheel 81 are connected by means of pawl 83, screwed to the face of 81, spring 84 holding pawl 83 in contact with the teeth of 82. Escapement-wheel 81 can therefore only move in one direction, as shown by arrow in Fig. 4. The wheel 85 rotates idly on the axle-pin 90, which is rigidly held in a hub of escapement-frame 73. (See Figs. 6 and 4.) The wheel 85 gears in the wheel 86, which is rigidly secured to and turns with one of the gear-wheels 87. Both wheels 87 are idle on the axle-pin 89, which is securely held in upper hub of the escapement-frame 73. The wheel 87 on the other end of axle-pin 89 gears in the wheel 88, which is rigidly secured to spring-drum 91, the latter being idle on axle 90. To the drum 91 is secured one end of spiral band-spring 92, the other end of which is secured to the exterior casing 93, which is fastened to frame 73 and therefore stationary to it, Fig. 5. To the under side of the matrix-carriage F is fastened (see Figs. 4 and 6) the double rack 94, gearing at the same time in the two wheels 87. When free to act, spring 92 rotates drum 91 and gear-wheel 88 idly on axle 90. Wheel 88 transmits its motion to one of the wheels 87 and through it to the double rack 94 and matrix-carriage F. The motion of the rack is transmitted to the pair of wheels 87 and 86, the latter imparting its motion to wheel 85 and ratchet-wheel 82, from which the motion is transferred through pawl 83 to escapement-wheel 81, where it is regulated by the joint action of the sliding bar 76 and escapement-pawl 78. In pushing the matrix-carriage back to start a new line, the rack 94 will rotate wheels 87, which, on one side of escapement-frame 73, through wheel 88, will wind up the spring 92. On the other side gear-wheels 87 and 86 will transmit their motion to wheel 85 and ratchet-wheel 82, which will move under pawl 83, leaving the escapement-wheel 81 stationary. In a state of rest the normal position of the bar 76 is with the detent 78' in engagement with the teeth of the escapement-wheel 81, being prevented from moving by the stop-pin 80, secured in proper position on the guide-block 74. When the bar 76 is thrown to the right by the action of the intermediate mechanism described, in depressing any one of the keys, (see Figs. 8, 9, and 4,) the detent 76' is brought into engagement with the teeth of the escapement-wheel 81 and the detent 78' released therefrom, when the pawl-arm 78 will fall by gravity through the distance of one or several teeth of the escapement-wheel 81. Reversing the motion of the slide-bar 76 by releasing the depressed key detent 78' will re-engage in its lower position the teeth of escapement-wheel 81, while detent 76' will be withdrawn from them, and wheel 81 will move until the extremity of pawl-arm 78 meets stop-pin 80. For the purposes of this machine it is necessary that all spaces in the line of the different characters employed should be referred to one common unit, which in our case is the distance the matrix-carriage travels while the periphery of the escapement-wheel moves the distance of one tooth. This distance may be made to vary for letters of different thicknesses by substituting for gear-wheels 85 and 86 other similar wheels of different relative diameters. We will call the distance traveled by the matrix-carriage proportional to one tooth of the escapement-wheel the "unit-space," and we make the space in the line of all letters and characters a multiple of this units-space. For instance, we make the line-space occupied by the letter "i" and most of the punctuation-marks and all similar characters equivalent to unit-spaces; of "f," "l," "t," "s," and similar characters three unit-spaces; of "a," "b," and equivalent characters and letters four unit-spaces; "F," "J," "L," &c., five unit-spaces; "m" and "w" and "A" and "B" and equivalent capital letters and other characters six unit-spaces, and "M" and similar characters eight unit-spaces. These proportions are, however, subject to changes, according to style of the alphabet employed or to the dictate of custom or fashion. In systematizing the spacing of letters and other characters in this manner it is found that nearly one-half of them require a similar and uniform line-space, while for the other half the spacing varies. For this reason, Figs. 8 and 10, the key-levers are divided into two sets 1 and 2. Levers 1 are made to operate the rod 103 and escapement mechanism only, and the other set 2 being longer are made to operate mechanism, whereby the relative fall of the pawl-arm 78 is regulated according to the line-space required by the particular letter or character to be stamped. In addition to the above two key-levers 3 and 4 are provided for spacing only, lever 3 for the production of unit-spaces and lever 4 for the ordinary spacing between words, which spacing in the machine, as illustrated, is made equivalent to the line-space of the letters of the alphabet, but which may be made to vary from this spacing, if found desirable. To the pawl-arm 78 is secured the laterally-projecting pin 79, (see Figs. 4 and 5,) so that in falling it will strike the plate 75, sliding in the guide-blocks 74. On plate 75 are formed steps, which when brought to the path of pin 79 will arrest the fall of the pawl-arm 78, so that detent 78' will engage the teeth of the escapement-wheel a distance of one, two, or more teeth from its highest position acquired in its upward movement, which is determined by the stop-pin 80. The rod 72, passing through a slot in the plate 75, rocking shaft 70, with levers 71 and disk 69, working in bearings in carriage-frame C, are duplicates of the parts described as producing the escapement of wheel 81, and whenever operated, as hereinafter described, produce a sliding motion of the plate 75. (See Figs. 15 and 6.) The crank-pin 69' on the disk 69 is connected by universal joints to one end of the lever 63 by a connecting-rod 68. The extended ends of the key-levers 2 and 3 are provided with laterally-projecting pins, which engage in the slots formed in the plates 66, the latter being rigidly secured to the shaft 65, which (see Fig. 17) oscillates in bearings in brackets g. To one end of the shafts 65 is fastened the lever 64, the oscillating end of which is provided with a laterally-extending pin 67, which acts as fulcrum-bearing for the lever 63. As already stated, one end of the lever 63 is connected to the disk 69. Its other end is connected by the link 62 to one arm of the bell-crank lever 61, to the other arm of which are connected by connecting-rod 60 the lever 59 and key-lever 53, the two latter being fastened to the same shaft 58, Fig. 17, working in bearings in brackets k and l on platform D. Key-lever 53 is only operated for changing from lower-case to capital letters and is normally held up by the spring 55. When it is depressed, it is held by a laterally-projecting tooth catching in a notch formed in the spring-lever 160. The lever 63 is released by depressing the lever 160.

The slots in the oscillating plates 66 are so formed that one part of the key-lever movement produces the required movement in the levers 64 and 63, but leaves them stationary during the last portion of the downward movement of the key-lever and while the key-lever is returning to its normal position. It also permits the working edges of all the plates to move out of contact with the pins on the other levers when any one of them is operated.

The oscillating shaft 65, with attached slotted plates 66 and levers 63 and 64, are brought back to their normal position of rest (see Figs. 16, 17, and 18) by the lever 105, which is fastened on the shaft 101, acting through the link 124 on the lever 123, secured to the shaft 65, the part of the link 124 connecting it with the lever 123 being slotted out, so that only the last part of the movement of the lever 105 is transferred to the lever 123 and in order that the lever 105 can move without affecting the lever 123 when the latter is in the position of rest. The position of rest of the slotted oscillating plates 66 and of the key-levers 2 is shown in Fig. 1. When any one of the key-levers 2 is depressed, the pin on the back end thereof, which engages in the slot in the plate 66, slides along the working edge, pushing the plate back during the first part of its movement, thereby depressing the back end of the lever 63. The front end of the lever 63 being held by the link 62 opposite the center of the shaft 65, it may be considered during this operation as a rigid part of the shaft 65 and as merely an extension of the lever 64. During the latter part of the movement of the pin on the key-lever 2 in the slot in the plate 66 the latter, with all the parts connected therewith, will remain stationary, while the escapement operation will take place by the disengagement of the detent 78' and coincident engagement of the detent 76'.

The motion of the end of the lever 63 will oscillate the shaft 70 and by means of the rod 72 will slide the plate 75 to a position so that in falling the pin 79 of the pawl-arm 78 will strike the step made for the spacing of the character represented by the key-lever depressed, the different motions for the spacing of the different characters being obtained by setting the working edge of the slot in the oscillating plates 66 at different angles to each other. The two extreme positions of the sliding plates 75 are shown in Figs. 4 and 16, respectively. The opening in the lower part of the slots in the oscillating plates 66 is formed concentric with the center of the shaft 65, so that any plate may be operated by its key-lever independently of the other key-levers. The keys 1 having no connection with the oscillating plates 66 or any moving parts connected in any way with them will in being depressed leave the sliding plate 75 in its normal position of rest and only operate the escapement. The edge of the plate 75, which in this case will be struck by pin 79 of the falling pawl-arm 78, is at a height that the proper spacing will be produced for the greatest number of letters occupying a uniform space in the line.

As capital letters and similar characters require one or several units more space than lower-case letters or characters, steps are formed for this purpose on the plate 75, which are brought into the proper position by shifting the plate 75 laterally. This is produced by depressing the key 53 until caught in under the catch 160, thereby lifting through the bell-crank lever 61 and the link 62 one end of the lever 63, turning it on the pin 67 as a fulcrum at the end of the lever 64, and depressing the other end of the lever 63 sufficiently to bring the proper step of the plate 75 in position through the connections already described.

The intermediate carriage E is made to receive a sliding motion on carriage-frame C at right angles to the sliding motion of the matrix-carriage F for the production of inter-line-spacing. (See Figs. 1, 4, 5, and 7.) To either side of the carriage-frame C is secured rack 112, into which gear pinions 111, both of which are fastened to the shaft 110. (See Figs. 4 and 6.) The shaft 110 turns in bearings in the side walls of the intermediate carriage E. On the same shaft is also secured the one-way ratchet-wheel 113, which is operated by pawl 115, held in contact by the spring 116 (see Fig. 7) and carried by the lever 114. The lever 114, fulcrumed on the end of the shaft 110, is provided at one end with the handle 118, the other end being formed into two branches each having a laterally-projecting pin 120. To the pawl-arm 115 is secured the handle 117, to lift it out of engagement with the ratchet-wheel 113. The plate 119 is provided with two slots sliding on studs 122, and on its lower edge are formed two notches 121.

In operation the lever 114 is moved in one direction until one of the pins 120 strikes against the under edge of the sliding plate 119, and then it is moved in the opposite direction until the other pin 120 strikes the under edge of 119, the dimensions and position of the different parts being so adjusted that the carriage E will be moved by the pinions 111, coacting with the racks 112, a distance corresponding with the body of the font of dies being used. In shifting the sliding plate 119 so that pins 120 will enter the notches 121 a leaded inter-line space will be obtained. In a similar manner by providing additional notches and shifting the plate 119 more a double-leaded inter-line space may be obtained.

Referring to Figs. 19, 23, and 24, as plan, side elevation, and cross-section respectively, and to details in Figs. 20, 21, 22, 25, and 26, the die-holder is composed of the main plate 14, to which is fastened by the screws 28 the rectangular hub 18, having at its lower face a circular projecting part 27, fitting in the hole 27', and a rectangular base limited at both sides by projecting ribs and fitting in the rectangular hole 26 in plate 15. One end of the plate 14 is turned up to receive the counterpoise 41, the other end having a rectangular enlargement. Superposed in plate 14 is plate 15, sliding easily by means of its hole 26 on base of hub 18. To plate 15 are rigidly secured by the screws 22 the shifting blocks 19 on its upper side and 20 on its lower side, the latter having a projecting rectangular part fitting in the hole 21 in plate 14 and sliding therein. To main plate 14 is also rigidly secured by a screw and a bolt fitting in the hole 13' friction-roller 13 and block 40, having a rectangular projecting part on its lower face fitting in the slot 25 in the plate 16, which slot also fits on the tongue 24 of the plate 15. Plate 16 has a segment-shaped extension, to which is secured by a number of screws and interposed distance-pieces the segment-shaped lower plate 17. In the segment-shaped part of plate 16 and in plate 17 are holes for the reception of the dies 32. The centers of these holes are disposed in circular arcs of equal radii. This radius is of a length corresponding with the distance from the center of the pivotal axis about which the die-holder as a whole oscillates to the center of the stamping-punch and the corresponding holes in the different series are arranged on lines parallel to a line drawn through the center of the pivotal axis 29 and the center of the friction-roller 13. The holes are arranged in two equal series equally disposed on either side of an intervening large space, each series being composed of three equal rows. The holes in the upper plate 16 are circular, while those in the lower plate are square. The dies 32 have a square shank fitting neatly and easily in the square holes in the plate 17. They have on their lower end a letter or other character cut in cameo. The upper portion of the shank is formed into a cylindrical stem slidingly fitted in the circular holes in the plate 16. The upper end of this stem is rounded and formed with a diametrical perforation for the reception of a pin adapted to serve as an abutment for the spring 32′, holding the square shoulder up against the under surface of the plate 16. The plates 16 and 17, secured together, which we will designate by the term "die-segment," form an independent part which may be duplicated for different styles of dies. This die-segment is connected to the parts already described by the pushing-plate 16, between the plate 14, and a shoulder on the block 40 into tongue 24 of the plate 15, and in a space left for the purpose between the laterally-projecting parts of the blocks 19 and 20, to which it is rigidly secured by the screws 23, so as to form with plate 15 a rigid part, sliding with ease longitudinally and in the same plane with the plate 15 and the blocks 19 and 20. The hub 18 and block 40 are connected by the bracing-rods 39 for the purpose of stiffening the arrangement. The hub 18 is fastened to the pivot-shaft 29, which oscillates in the pivot-bearings $v$ and $u$, both bearings being fastened to framework B. Partly to the reduced end portion 29′ and partly to the body part 29 of the pivot-shaft is fitted a sliding sleeve 33, freely sliding thereon longitudinally, but prevented from turning on the shaft by a screw-point engaging in a groove 29″. (See Fig. 24.) The lower part of the sleeve 33 is connected to the horizontal arms of the two angle-levers 36 by the two connecting-rods 35. Both angle-levers 36 are fastened to the same fulcrum-pin, passing through a hole near one of the corners of the rectangular hub 18. The vertical arms of the angle-levers 36 are connected to the sliding block 19 by connecting-rods 37. Between the hub 18 and the sliding block 19 is inserted a spring, tending to hold them apart and taking up the play in the different connections. The upper reduced part of the sleeve 33 is provided with a collar 34, in which it can freely and easily rotate. To projecting parts of the collar 34 are connected the ends of the two levers 42 by screws, forming easy working joints. The two levers 42 are fastened by a common hub to the fulcrum-shaft 43, turning in bearings $t$, Fig. 3, on top frame B. To one end of the shaft 43 is fastened the lever 44, (see Fig. 1,) the end of the front arm of which is connected to the lower part of the frame B by the spring 45, holding it normally down, and thereby the end of the back arm 44 is held up. This end is connected by the connecting-rod 47 to the end of the lever-arm 48, the latter being fastened to the fulcrum-shaft 49, turning in bearings in the standards $h$, which are screwed fast to the bed-plate A. The end of the lever 50, fastened on the same fulcrum-shaft, is connected by the connecting-rod 51 to the end of the vertical arm of the angle-lever 52, which is fulcrumed in support $k$ on platform D. (See Figs. 1 and 3.) The horizontal arm of the lever 52 is provided on its two faces with the projecting pins 56 and 57, both being in contact with the key-levers 53 and 54 when up. The pins, being at different distances from the fulcrum of the angle-lever 52, are of different diameters. Key-lever 54 is in all respects similar to key-lever 53, already described, except that it is idle on its fulcrum-pin, which is an extension of the shaft 58. Both key-levers 53 and 54 are provided with laterally-projecting catch-plates adapted to engage in the notch in spring-lever 160. The catch-plate on key-lever 54 is somewhat longer than the one on the key-lever 53, so that when the lever 53 is held by the spring-lever 160 in a depressed position and lever 54 is subsequently depressed the former will be released. The depression of the key-lever 53, as already described, will change the line-spacing from that for lower-case or ordinary letters to that for capitals. The first row of dies in the die-holder containing lower-case characters is in a position relatively to be rotated under the stamping-punch when the key-levers are in their normal non-depressed position. When the key-lever 53 is depressed, the second row of dies, containing the capitals and associated characters, is shifted into the same position, and at the same time the spacing is altered to correspond to capitals, &c. When key-lever 54 is depressed, and lever 53 thereby released, restoring the spacing to that for lower-case characters, the third row of dies, containing figures, fractions, and commercial and other signs, will be brought into operative position when the die-holder is rotated under the stamping-punch. The different parts operated for this purpose are so proportioned that these results are obtained.

The normal position of rest of the die-holder is a central one, as illustrated in Fig. 3. It is held in this position by the friction-roller being placed between the two forked levers 10. Each of these two levers can be operated independently of each other by a different series of key-levers, and each is provided with a slot 12, exactly fitting over the friction-roller 13. The outside prong of each fork is long enough to project beyond the friction-roller, while the inside prong is of such a length that the roller in the oscillating of the die-holder can just move past it. The forked levers 10 are fastened to the pivot-spindles 11, oscillating in bearings $r$, the latter being fastened to the brackets $q$, secured to the projecting parts $p$ of the elevated framework B. Levers 10, moving in a horizontal plane, are connected to levers 8, moving in a vertical plane, by the connecting-rod 9, with universal joints. Each of the two levers 8 are fastened to the extreme ends of the fulcrum-shaft 7. The two shafts are operatively independent of each other and lie in the same axis, having bearings in the supports e and e', fastened to bed-plate A. (See Figs. 1, 13, and 17.)

To each fulcrum-shaft 7 are fastened a series of slotted lever-arms 5 of graduated length. (See Figs. 1, 3, 12, 13, and 14.) The whole number of these arms is equal to the number of dies in one row in the die-holder. In the slot in each lever-arm 5 a pin 6 engages, which is fastened to the key-levers 1 and 2 at graduated distances from the fulcrum-points of the key-levers. These slots in the lever-arms 5 are so formed that all in one series can be lifted out from engagement with the pins 6 by the depression of any one of the key-levers or otherwise without affecting the position of any of the key-levers at rest, and they are further formed so that when any one of the key-levers is depressed to the proper degree, which is the same for all of them, its pin 6 will engage and be regidly held in the hook of its slotted lever-arm 5. By this means the momentum of the die-holder will be prevented from carrying it beyond the proper point. The two extreme positions of the slotted levers 5 are shown in dotted lines in Fig. 14 as consequent on the key-lever 1 being brought to the position shown in dotted lines. The graduated dotted arcs represent the travel and position of the pins 6 on the key-levers 1 and 2 in each series.

In operating the machine, if a key of the left-hand series, as represented in Figs. 12, 13, and 14, is depressed all the lever-arms 5 will be lifted out of contact with the pins 6 on the key-levers at rest. The lever-arm 8 will be oscillated and communicate its motion through the connecting-rod 9 to the forked lever 10. The slot 12 will engage with the friction-roller 13 and through it the die-holder will be rotated to the left, which will bring the required die of the right-hand series of dies into operative position under the stamping-punch, the parts being so proportioned that this will take place. When a key on the right-hand side is depressed, the operation will be exactly similar, except that the movement of the die-holder will be in the opposite direction.

In the bearings n n and o o of the top framework B are supported in line with each other the two shafts 125 and 129. To one end of the shaft 125 is secured a pulley 126, by means of which the shaft is constantly rotated when the machine is in use by some motive power provided therefor. The end of the shaft 129, near bearing n, is formed into a crank-disk 130, the pin of which is connected by a link 131 to the sliding head 132, to the lower end of which in a central hole formed therefor is fitted a punch 133 and retained by a set-screw. The sliding head 132 is guided in a guide-block w, which is fastened to the front part of the top framework B. The two shafts meet between the two central bearings o o, the space between the two bearings being occupied by a clutch-coupling composed of the cheek 127, securely fastened to the shaft 125, and the sliding cheek 134, sliding on feathers on the shaft 129. On the reduced part of this coupling-cheek 134 is revolubly fitted the collar 135, to which is connected on its upper and under sides the two arms of the angle-lever 153. The lever 153 is fulcrumed on a screw passing through a hub connecting the two arms of the lever, which is screwed into the top of the framework B. (See Figs. 1, 3, and 34.) When any of the keys, except those used for spacing only, are depressed, it is necessary that only one revolution of the constantly-rotating shaft 125 should be transmitted through the coupling to the shaft 129 independent of how long the said key is held in a depressed position. It is further desirable that the force required to operate the device provided for this purpose should not be appreciable on the key-levers and that the stamping operation should take place at the instant when the key is fully depressed, and therefore when the proper type is exactly in its operative position. These results are obtained alike for all keys in the following manner: To the shaft 125 (see Figs. 1, 3, and 27) is fastened the disk 128, which has secured to it a laterally-projecting pin 147, in the path of which and eccentric to such path is the properly-curved surface of the projecting part 145 (see Figs. 27 and 28) of the lever-arm 138 of the double-fulcrumed angle-lever 138 140 when the piece 145 is in the position shown in Figs. 27 and 34, its normal position being that shown in Fig. 1. In this manner the rotation of the pin 147 gives to the top of the lever 138 an oscillating movement outward from the center of the shaft 125. There is immediately under the projecting part 145 and in the path of the end of the pin 147 an oblique projection 146 on the lever-arm 138, the latter turning with the fulcrum-shaft 136 in bearings s, fastened to framework B and transferring this motion to the lever-arm 148, which is also fastened to the fulcrum-shaft 136. The top part of the lever-arm 148 is connected to the angle-lever 153 by the link 154. (See Figs. 3 and 34.) This constitutes the arrangement for coupling the constantly-rotating shaft 125 to the punch-operating shaft 129. For the purpose of disengaging the coupling after one rotation of the shaft 129 has been effected the shaft 129 has fastened to it a disk 152, provided with a laterally-projecting pin 149, similar to the pin and disk 147 and 128. The top part of the lever 148 (see Figs. 29 and 34) is formed into a curve 150, eccentric to the path of the pin 149, so that in its revolution the pin will engage with the curved top of the lever and move that end of the lever-arm 148 inward toward the center of the shaft 129—that is, to its normal position—until the pin 149 is stopped by striking against the stop-shoulder 150' on the lever 148.

To bring lever-arm 138 from its normal oblique position, (that shown in Fig. 1,) where its projecting parts 145 and 146 are out of reach of the revolving pin 147, to its vertical position, (that shown in Figs. 27 and 34,) where the said parts are in the path of the said pin, angle-lever 138 140, in addition to its rotary movement about the axis of the shaft 136, is fulcrumed on the pin 139, passed at right angles to the axis of the shaft 136 through the angular hub of the arm 137, which is rigidly secured to the shaft 136. The arm 137 is placed in an oblique position relative to the axis of the shaft 136 and serves as a guide and support for the angle-lever 138 140, which has two cheeks which fit over the arm 137. To the horizontal ends of the angle-lever 138 140 at 140 are joined the two side arms of the lever 141, (see Figs. 27 and 34,) the extremities 142 of which are connected to two sliding strips 143. To the top end of the two strips 143 is fastened, rigidly connecting the same, the catch 191, which under certain conditions engages the hook of pawl 144, which is joined to and between the two cheeks of the tops of the lever-arm 138 by a pin, so as to turn easily and so as to be held or to fall back into a normal position after having been lifted by the action of gravity or of a light spring. The strips 143 are guided in a block 193, fastened to the oblique arm 137. They are rigidly connected a little above their lower end by a cross-bridge, between which and the guide-block 193 is inserted a spring 192, tending to force the strips and connected lever-arms downward. In the part bent at right angles to the side arms of the lever 141 and in a cross-bridge connecting the two sides of the lever 140 are formed the bearings for the pin 141', to the outer end of which is joined the connecting-rod 155, thereby making a universal joint between the lever 141 and the connecting-rod 155. This joint is held up by the spring 156, acting between the shoulder formed at the hinge-joint and an abutment-bracket secured to the top framework B. The functions of the spring 156 consist principally in counterbalancing. The lower end of the connecting-rod 155 is joined by a slotted joint 157 (see Fig. 1) to the end of the horizontal arm of the angle-lever 158, which turns on a fulcrum-pin secured to the standard $i$, screwed to the bed-plate A. The end of the vertical arm of the lever 158 is connected by connecting-rod 159 (see Fig. 1) to the lever-arm 104, which is rigidly secured on the shaft 101. When any of the key-levers are depressed, thereby turning the shaft 101 and lever-arm 104, the end of the horizontal arm of the lever 105 will be depressed, its pin moving idly in the slot 157 until the last part of the movement, when the connecting-rod 155 will be drawn downward against the action of the pin 156. This by turning the lever 141 on the connecting-pins 142 as a fulcrum will bring the lever-arm 138 from its normally-oblique position (see Fig. 1) to the vertical position shown in Figs. 27 and 34, when the pin 147, engaging with the eccentric curve of the projection 145, (see Fig. 28,) will throw the levers 138 and 148 outward sufficiently to close through the connections already described the couplings, at the same time moving the stop-shoulder 150 of the lever 148 sufficiently outward to bring the groove 151 into the path of the pin 149. The groove 151 is circular and when in this outwardly-tilted position concentric with the path of the pin 149. The shaft 129 is in this manner caused to make one revolution, which will produce one reciprocated movement of the sliding head 132 and with it the stamping-punch 133, thereby stamping or pressing the die already brought into the proper position, as hereinafter described, into the matrix-board supported on the matrix-carriage F. While the pin 149 is moving through the groove 151, (see Fig. 29,) the butt end of pin 147 (see Figs. 27 and 28) will slide along the oblique face of the projection 146 of the lever-arm 138, thereby throwing the lever-arm 138 back to its normal oblique position. In this instance and under the supposition that the key is not immediately released from its depressed position the center of the joint between the connecting-rod 155 and the lever 141, being stationary, will act as a fulcrum for the latter, and the lever end 140 of the lever 138 140, rising, will cause lever end 142 of the lever 141 to rise, lifting the strips 143 against the action of the spring 192. This will cause the catch 191 to engage with the hook of the pawl 144, remaining in this position until the key is released. When the key is released, the spring 156 will lift the rod 155 and the joint connecting it with the lever 141. In this instance the connecting-joint between the lever 141 and the angle-lever 138 140 will remain stationary, and therefore act as a fulcrum-bearing for the lever 141. The extremity 142 of the lever 141 will move down by the joint action of the springs 156 and 192, the catch 191 will be withdrawn from the pawl 144, and the device as a whole will be in a position, as shown in Fig. 1, suitable for the operation, as described, to be repeated by the depression of another key or a second depression of the same key. To one side of the intermediate carriage E (see Figs. 31, 32, and 33) is fastened the bell 161, while to the back side of the same carriage is fastened the plate 166. On a pin passing through projecting lugs of the plate 166 and turning freely in them are fastened the two lever-plates 163 and 164. The plate 164 has on its outward side a projecting nose, catching on the end of one arm of the lever-catch 165, fulcrumed to a hub on a projecting rib of the plate 166. The other arm of the lever 165 is bent downward and is provided on its extreme end with an upwardly-projecting lug 165'. The lever 16 is caused to catch in the nose of the lever-plate 164 by a light spring. (Not shown.) The lever 163 presses on the spring-wire 162, which is fastened at one end to the projecting hub 166' of the plate 166 and carries on its outer end the bell-tapper. To the back side of the matrix-carriage F and parallel with the direction of its motion is fastened by lugs 169 rod 167, provided with two sliding buttons 168 and 168', which can be fastened at any convenient point in the length of the rod 167 by set-screws. The sliding buttons 168 and 168' are formed on their lower side with projecting pins, which act as stop-pins.

The operation of the signaling-bell is as follows: When the matrix-carriage is pushed by hand toward the left and over the bell for starting a line, the button 168' having been secured at the proper point on the rod 167, the stop-pin on the button 168' will strike against the back part of the lever-plate 164, turning it against the action of the spring-wire 162 until the catch of the lever 165 catches in the nose of the plate 164. By this operation the lever 163 will press the spring-wire 162, which carries on its end the bell-tapper outward to a position ready to strike the bell. When by the manipulation of the keys the carriage F is fed gradually forward in the opposite direction toward the left through the action of the escapement already described, the stop-pin of the sliding button 168, set and fastened at the proper place on the rod 167 for the desired ending of the line, will come in contact with the lug 165', placed in an oblique position in relation to the movement of the matrix-carriage, pushing the catch of the lever 165 out of engagement with the nose of the lever-plate 164, and the hammer, being impelled by the spring-wire 162, will strike the bell 161. The matrix-carriage can, however, continue its movement until the stop-pin on the button 168 comes in contact with the back end of the lever-plate 164. The distance in the movement of the matrix-carriage F between the warning of the bell and the end of the line, usually equivalent to the space necessary for from fifteen to twenty letters, is line-margin, within which the justification of the line is to be made. By setting and fastening the sliding buttons 168 and 168' at the proper points in the length of the rod 167 lines can be made to start and to end at any desired point within the margin of movement of the matrix-carriage F. The locking-plate 109, formed with a rib 109', (see Figs. 1 and 35,) is hung by its side levers 109² on screw-points under the platform D, so that the upper edge of the rib 109' is just below the ends of all the key-levers 1, 2, 3, and 4. To one of the side levers is fastened a stud, by means of which it is connected by the connecting-rod 107 to the lever 106, fastened to the shaft 101. (See Figs. 1, 10, and 11.) To the connecting-rod 107 at a short distance from its end toward the side lever 109² is fastened the end of a spring 210, the other end of which (see Fig. 35) is fastened to the stud on the side lever 109². A pin or a screw projecting from the stud passes through a slot in the end of the connecting-rod 107. To the side of the rod 107 is secured a pin or screw which acts as a fulcrum for the thumb-lever 108. If this lever 108 is lifted, as shown in Fig. 35, the edge of the rib 109' is drawn in under the ends of the key-levers, preventing any of them from being depressed. If the thumb-lever 108 is depressed, the edge of the rib 109' is withdrawn from under the ends of the key-levers, so that any of them may be depressed, the edge of the lever 108 which engages with the pin projecting from the stud being so shaped that when the lever 108 is depressed this pin is moved in the slot toward that end of the connecting-rod 107 part of the length of the slot. The top of all the ends of the key-levers are beveled off, so that when any one of the key-levers is depressed the edge of the rib 109' can, without interfering with the end of the key-lever being depressed, immediately move in under the ends of the other keys. The rib 109' is drawn in under the ends of the key-levers when any one of them is depressed by the action of the key-lever on lever 102, shaft 101, lever-arm 106, and connecting-rod 107, (see Figs. 1, 10, 11, and 35,) any excess of movement of the lever-arm 106 being compensated for by the spring 210, the slot in the end of the rod 107 being formed long for this purpose.

The machine may be provided with an index composed (see Figs. 1 and 3) of an ordinary scale similar to those used in type-writing machines, secured to the front edge of the matrix-carriage F, and an index-plate with an index-line thereon fastened to adjustable sliding button 173, sliding on the rod 174, the latter being fastened to the front side of intermediate carriage E, parallel with the movement of the matrix-carriage F. When dies corresponding to fonts of small type are used, the divisions on the scale become so small that an extra effort is required to read them. As these readings have to be done as quickly as possible in order to properly adjust the line after the bell has been struck, it is found of an advantage to use an arrangement whereby the divisions are relatively enlarged. This device (illustrated in Figs. 36 and 37) consists in a main plate 201, fastened to the intermediate carriage E, to which is joined by screws 207 and 207' and by thumb-screw 209 the plate 203. For the screw 207' is provided a slot 206 in the plate 203, and for thumb-screw 209 a slot is made in the main plate 201, so that the plate 203 can be turned around screw 207 as a fulcrum. To the plate 203 is secured by a number of distance-pieces and screws the dial-plate 204. Between the plates 203 and 204 are placed the gear-wheels 202, fastened to pivot-spindles, the central one protruding through the dial-plate 204 and having an index-hand secured thereto. One of the wheels 202 gears into the rack 208, fastened to the front side of the matrix-carriage F. When the thumb-screw 209 is loosened, the plate 203, with all its connected parts, can be turned so that the gear-wheel 202 is disengaged from the rack 208. The matrix-carriage F is then set in position for the end of the line. The hand 205 is turned to the zero-point of the divisions of the dial-plate 204, these divisions corresponding to unit-spaces. Plate 203 is turned back so that the teeth of the wheel 202 mesh with the teeth of the rack 208, and the matrix is pushed to the right ready to begin a line. The different desired keys are operated, causing the matrix to move toward the right. When the warning-bell is struck, the word then being stamped is finished, and then the number of divisions on the dial-plate 204 from the position of the index hand 205 is read off and compared with the number of unit-spaces necessary for the succeeding words, spaces, and full syllables which would fill or nearly fill the line. The number of unit-spaces necessary to justify the line are then gradually added to the regular spaces between the remaining words.

The manner of securing the matrix-board to the matrix-carriage is illustrated in Figs. 31, 32, and 33. To the back side of the matrix-carriage F is secured the lipped strip 170, under the lip of which the matrix-board can be slipped. To the back part of the sides of the matrix-carriage F are hinged the angular side strips 171, one side of which overlaps the side edges of the matrix-board. The angular strips 171 are held down on pins at their front ends by notches formed in the latches 172, (see Fig. 32,) which are made so as to press the matrix-board firmly down to the surface of the matrix-carriage F.

We claim—

1. In a matrix-making machine, the combination, with a fixed axis or hub, of a sliding plate movable radially with relation to the hub, segmental die-plates secured to the sliding plate, angle-levers fulcrumed on the hub, and means for actuating the angle-levers and the sliding plate therefrom, substantially as and for the purposes specified.

2. In a matrix-machine, the combination, with a fixed axis or hub, of a main plate secured thereto, a sliding plate provided with shifting blocks, levers fulcrumed on the hub or axis, connecting-rods which connect the levers on the hub with the shifting blocks, a suitable die-carrier, and means for actuating the levers on the hub, substantially as and for the purposes specified.

3. In a matrix-machine, the combination, with a suitable die-holder, of a hub or axis, a main plate secured to the said hub, a sliding plate provided with shifting blocks and to which the die-holder is secured, and means to move the sliding-plate in a radial line to and from the hub or axis, substantially as and for the purposes specified.

4. In a matrix-machine, the combination, with a fixed axis, of a main plate secured thereto and provided with a counterpoise, a radially-sliding plate, a die-carrier secured to the radially-sliding plate, and means for causing the movement of the radially-sliding plate to and from the fixed axis or hub, substantially as and for the purposes specified.

5. In a matrix-machine, the herein-described die-holder, consisting in two parallel plates rigidly secured together at a proper distance apart, said plates being correspondingly formed with several rows of guide-holes for the reception of the dies, arranged in circular arcs, the centers of which when the dies are in operative position are in the axis of a pivot-shaft, one of said plates being rigidly secured to a radially-sliding plate, the said sliding plate being supported and guided by parts rigidly secured to a main plate which is secured by means of a hub to the pivot-shaft, about the axis of which the device as a whole can be rotated in a plane parallel to that of the said plates, substantially as described, and for the purposes specified.

6. In a matrix-machine, the herein-described die-holder, consisting in two parallel plates rigidly secured together a proper distance apart, said plates being correspondingly formed with several rows of guide-holes for the reception of the dies, arranged in circular arcs, the centers of which when the dies are in an operative position are in the axis of a pivot-shaft, one of said plates being removably secured to a radially-sliding plate, the said sliding plate being supported and guided by parts rigidly secured to a main plate which is secured by means of a hub to the pivot-shaft, about the axis of which the device as a whole can be rotated in a plane parallel to that of the said plates, substantially as described, and for the purposes specified.

7. In a matrix-making machine, the combination, with a pivoted die-holder arranged and adapted to slide radially to and from its axis, of a projection on the die-holder and two levers pivoted on opposite sides of the die-holder and having forks which engage the projection on said die-holder, substantially as and for the purposes specified.

8. In a matrix-machine, the combination, with a vibratory die-holder provided with dies arranged in the arc of a circle and having a friction-roller arranged on a radial line from the axis of vibration of said holder, of two pivoted forked levers the forks of which engage the friction-roller on the die-holder, two independent fulcrum-shafts, separate connections between the respective pivoted forked levers and the independent fulcrum-shafts, and two series of keys, the keys of each series having graduated connections with its fulcrum-shaft, substantially as and for the purposes specified.

9. In a matrix-machine, the herein-described die-holder, in which the receptacles for the dies are arranged in a circular arc concentric with a pivot-shaft about which the said die-holder is adapted to be rotated, in combination with means for giving the said die-holder different degrees of rotation for the similar degrees of movement given to the different key-levers, said means consisting in a series of lever-arms of relatively-different lengths, rigidly secured to a common fulcrum-shaft, mechanical connections between said fulcrum-shaft and said die-holder, and pins on the key-levers which engage with the said lever-arms, combined and operating substantially in the manner and for the purposes specified.

10. In a matrix-machine, the combination, with a vibratory die-holder having a stud for the engagement of forked levers, of two pivoted forked levers, each lever having one prong shorter than the other, and means for independently actuating said pivoted forked levers, substantially as and for the purposes specified.

11. In a matrix-machine, the combination, with a fixed axis or hub, of a radially-sliding die-holder mounted on said hub, means for causing the movement of said die-holder to and from the hub, a stud on said die-holder, said stud arranged on a radial line from the axis of vibration of the die-holder, two pivoted levers having forks which engage the stud on the die-holder, and means for independently actuating each of said forked levers, substantially as and for the purposes specified.

12. In a matrix-making machine, the herein-described die-holder, in which the receptacles for the dies are arranged on circular arcs in two series equally disposed on either side of a central line, said die-holder being adapted to be rotated about a pivot-shaft in opposite directions and also adapted to move to and from its axis of rotation, in combination with a stud rigidly secured to said die-holder at a distance from its axis of rotation, two bifurcated levers adapted to engage with said stud and rotate the said die-holder in relatively-opposite directions, respectively, key-levers, and intermediate connections between the said levers and the said bifurcated levers, substantially as described, and for the purposes specified.

13. In a matrix-machine, a key-lever provided with a laterally-projecting pin, a fulcrumed lever-arm formed with a hook-shaped end adapted to engage with the pin on said key-lever, thereby defining the relative angle between the two levers and thereby limiting the operative extent of movement of the key-levers, combined and operating substantially in the manner described, and for the purposes specified.

14. In a matrix-machine, a series of key-levers supported on a common fulcrum-pin, said levers being provided with laterally-projecting pins at graduated relatively-different distances from the common fulcrum-bearing of the said levers, combined and operating with a series of lever-arms rigidly secured to a common fulcrum-shaft, said lever-arms being of relatively-different graduated lengths and being formed with slots adapted to engage with the said laterally-projecting pin, said slots being open on one side, adapting any one of the series of lever-arms to be operated by the key-lever coacting therewith independently of the other key-levers, substantially as described, and for the purposes specified.

15. In a matrix-machine, the herein-described die-holder, adapted to be given a rotary movement about a pivotal axis, a stud rigidly secured to the said die-holder at a distance radially from its axis of rotation, a bifurcated lever-arm adapted to engage with said stud, intermediate connections between said lever-arm and an oscillating fulcrum-shaft, a lever-arm rigidly secured to said fulcrum-shaft, said lever-arm being formed with a closed ended slot, key-levers, and laterally-projecting pins on said key-levers, combined and operating substantially in the manner described, and for the purposes specified.

16. In a matrix-machine, the herein-described mechanism for forcing the die into the matrix-board, consisting in two shafts revolubly supported in line, a coupling between said shafts, whereby the said shafts may be operatively connected or disengaged, a drive-pulley secured to one shaft, a punch operated by the other shaft, a disk on the drive-pulley shaft, a fulcrumed vibrating lever actuated by the disk, a shaft actuated by the vibrating lever, and a second lever-arm on said shaft, which actuates the coupling or clutch for connecting the said shafts by the depression of the key-levers and for automatically disconnecting the same, combined and operating substantially as and for the purposes specified.

17. In a matrix-machine, two shafts supported in line in fixed journal-bearings, adapted to be mechanically connected and disconnected, one of said shafts having secured to it at or near one of its ends a driving-pulley and to its other end a coupling-cheek, the other shaft having secured to one of its ends a shifting coupling-cheek and to its other end a crank connected by a link to a guide-head to which is removably secured a stamping-punch, combined and operating substantially as described, and for the purposes specified.

18. In a matrix-machine, the herein-described mechanism for forcing the die into the matrix-board, consisting in two shafts revolubly supported in line, a coupling between said shafts, whereby the said shafts may be operatively connected or disengaged, a driving-pulley secured to one shaft, a punch operated by the other shaft, and means, substantially as described, for connecting the said shafts by the depression of the key-levers and for automatically disconnecting the same, combined and operating substantially as described, and for the purposes specified.

19. In a matrix-machine, two shafts supported in line in journal-bearings, a coupling between said shafts adapted to operatively connect and disconnect the same, and a disk secured to each of said shafts, each of said disks having a pin projecting from its face, adapted when the disks to which they are secured are rotated to engage, respectively, with two lever-arms secured to a common fulcrum-shaft, one of said lever-arms being connected to the shifting member of said coupling, combined and operating substantially as described, and for the purposes specified.

20. In a matrix-machine, a power-driven shaft, a shaft by which the die-punch is operated, a shifting coupling between said shafts, a crank-pin secured on the said power-driven shaft, a lever-arm secured to a fulcrum-shaft, and connections between the said fulcrum-shaft and the shifting member of the said coupling, whereby the rotation of said fulcrum-shaft is adapted to operatively connect and disconnect the said power-driven shaft and the said punch-operating shaft, said lever-arm being formed with a curved cheek eccentric to the path of revolution of the said pin and the said lever-arm being fulcrumed on a pin secured diametrically to said fulcrum-shaft, adapting the said lever-arm to be tilted to a position in which the said curved cheek is in a position to be engaged by the said revolving crank pin, the said lever-arm being formed with an inclined cheek adapted to engage with the end of said revolving crank-pin, whereby the said lever-arm is tilted to an oblique position relative to said fulcrum-shaft, placing the said curved cheek of the said lever in a position beyond the path of said revolving crank-pin, combined and operating substantially in the manner and for the purposes specified.

21. In a matrix-machine, a power-driven shaft, a shaft by which the die-punch is operated, a shifting coupling between said shafts, a disk secured on the said power-driven shaft, a projecting pin on said disk, a lever-arm secured to a fulcrum-shaft, connections between the said fulcrum-shaft and the shifting member of the said coupling, whereby the rotation of said fulcrum-shaft is adapted to operatively connect and disconnect the said power-driven shaft and the said punch-operating shaft, said lever-arm being formed with a curved cheek eccentric to the path of revolution of the said pin and the said lever being fulcrumed on a pin secured diametrically to said fulcrum-shaft, adapting the said lever-arm to be tilted to a position in which the said curved cheek is in a position to be engaged by the said revolving pin, the said lever-arm being formed with an inclined cheek adapted to engage with the end of said revolving pin, whereby the said lever-arm is tilted to an oblique position relative to the said fulcrum-shaft, placing the said curved cheek of the said lever in a position beyond the path of the said revolving pin, and means, substantially as described, for retaining the said lever-arm in the said tilted oblique position, combined and operating substantially in the manner and for the purposes specified.

22. A power-driven shaft, a second independently-supported shaft, a shifting coupling between the said shafts, a crank-pin secured to said power-driven shaft, a lever-arm fulcrumed to a fulcrum-shaft, and intermediate connections between the said fulcrum-shaft and the said coupling, said lever-arm being formed with a curved cheek eccentric to the path of revolution of the said crank-pin and a cheek inclined to the plane of revolution of the said crank-pin, combined and operating substantially in the manner and for the purposes specified.

23. In a matrix-machine, a power-driven shaft, a second independently-supported shaft, a shifting coupling between the said shafts, a crank-pin secured to the said power-driven shaft, a lever-arm fulcrumed to a fulcrum-shaft, intermediate connections between the said fulcrum-shaft and the said coupling, a crank-pin secured on said second independently-supported shaft, and a second lever-arm rigidly secured on said fulcrum-shaft, said fulcrumed lever-arm being formed with a curved cheek eccentric to the path of revolution of the crank-pin secured on the said power-driven shaft and a cheek inclined to the plane of revolution of said crank-pin and said second lever-arm being formed with a stop-shoulder adapted to engage with the crank-pin secured on the said second independently-supported shaft, combined and operating substantially in the manner and for the purposes specified.

24. In a matrix-machine, a power-driven shaft, an independently-supported shaft to one end of which is secured a crank-head and connected reciprocating punch-head, a shifting coupling between the said shafts, a crank-pin secured on the said power-driven shaft, a lever-arm fulcrumed on a fulcrum-shaft, intermediate connections between said fulcrum-shaft and said coupling, a crank-pin secured on said punch-operating shaft, and a second lever-arm rigidly secured on said fulcrum-shaft, said fulcrumed lever-arm being formed with a curved cheek eccentric to the path of revolution of the crank-pin on the said power-driven shaft and a cheek inclined to the plane of revolution of the said crank-pin and said second lever-arm being formed with a stop-shoulder adapted to engage with the crank-pin secured on said punch-operating shaft, combined and operating substantially in the manner described, and for the purposes specified.

25. In a matrix-machine, a power-driven shaft, an independently-supported punch-operating shaft, a shifting coupling between the said shafts, a crank-pin secured on the said power-driven shaft, a double fulcrumed lever-arm adapted to engage with and be operated by the said crank-pin, intermediate connections between the said lever-arm and the said coupling, key-levers, and intermediate connections, substantially as described, between the said key-levers and the said lever-arm, whereby the manipulation of the said key-levers will bring the said lever-arm into a position to engage with the said crank-pin, thereby effecting the connection and disconnection of the said shafts, combined and operating substantially in the manner and for the purposes specified.

26. In a matrix-machine, in combination with the sationary carriage-frame and matrix-carriage, an intermediate carriage adapted to be given a movement transverse to the line-length, and means for effecting and governing such movement, consisting in a gear-pinion and operating ratchet-wheel, pawl and pawl-lever secured on the said intermediate carriage, and a rack secured to the supporting-framework, combined and operating substantially as and for the purposes specified.

27. In a matrix-machine, in combination with the matrix-carriage, an intermediate carriage adapted to be given a movement transverse to the line-length and means for effecting and variably governing such movement, consisting in a gear-pinion and operating-pawl and pawl-lever secured on the said intermediate carriage, said pawl-lever being provided with stops adapted to engage with a sliding plate formed with differential notches, and a rack secured to the supporting-framework, combined and operating substantially as and for the purposes specified.

28. In a matrix-machine, the herein-described means for rewinding the matrix-carriage-propelling mechanism, consisting in a double rack secured to the matrix-carriage, intermediate gear-wheel between one member of said rack and the gear-wheel secured to the spring-hub, intermediate gear between the other member of said rack and a ratchet-wheel and coacting spring-governed pawl secured on the escapement-wheel, combined and operating substantially in the manner and for the purposes specified.

29. In a matrix-machine, the herein-described line-length-signaling device, consisting in an adjustable button 168, formed with a projecting interference-pin, rod 167, lever-arm 165, lever-arms 163 and 164, spring tapper-rod 162, with attached tapper, and bell 161, combined and operating substantially in the manner and for the purposes specified.

30. In a matrix-machine, the herein-described line-length-signaling device, consisting in an adjustable button 168, formed with a projecting interference-pin, rod 167, lever-arm 165, lever-arms 163 and 164, spring tapper-rod 162 with attached tapper, and bell 161, in combination with the adjustable button 168', formed with a projecting stop-pin, combined and operating substantially in the manner and for the purposes specified.

31. In a matrix-machine, the herein-described device for indicating in the operation of the machine the unoccupied line-space on the matrix-board, consisting in a graduated dial-plate, indicating dial-hand, and operating gear-wheels supported by the intermediate carriage, and a rack secured to the matrix-carriage, said gear-wheels being supported in such manner as to adapt them to engage with and be disengaged from the said rack, combined and operating substantially in the manner and for the purposes specified.

32. In a matrix-machine, the herein-described means for locking the keys against depression, consisting in a cross-bar dependently supported at either end by pivoted arms, intermediate connections between said pivoted arms and the different key-levers, whereby the said cross-bar is brought by the depression of any key-lever under the ends of the other key-levers, substantially as described.

33. In a matrix-machine, the herein-described means for locking the keys against depression, consisting in a cross-bar dependently supported at either end by pivoted arms and intermediate connections between said pivoted arms and the different key-levers, in combination with a catch, a slot in the end of the connecting-bar directly connected with the said pivoted arms, and a recoil-spring whereby the said cross-bar may be brought under the ends of all the keys, substantially as described, and for the purposes specified.

In testimony whereof we have affixed our signatures, in presence of two witnesses, this 10th day of December, 1891.

ALBERT J. KLETZKER.
JOHN G. GOESEL.

Witnesses:
A. RAMEL,
JOS. W. CROOKES.